Patented Oct. 23, 1928.

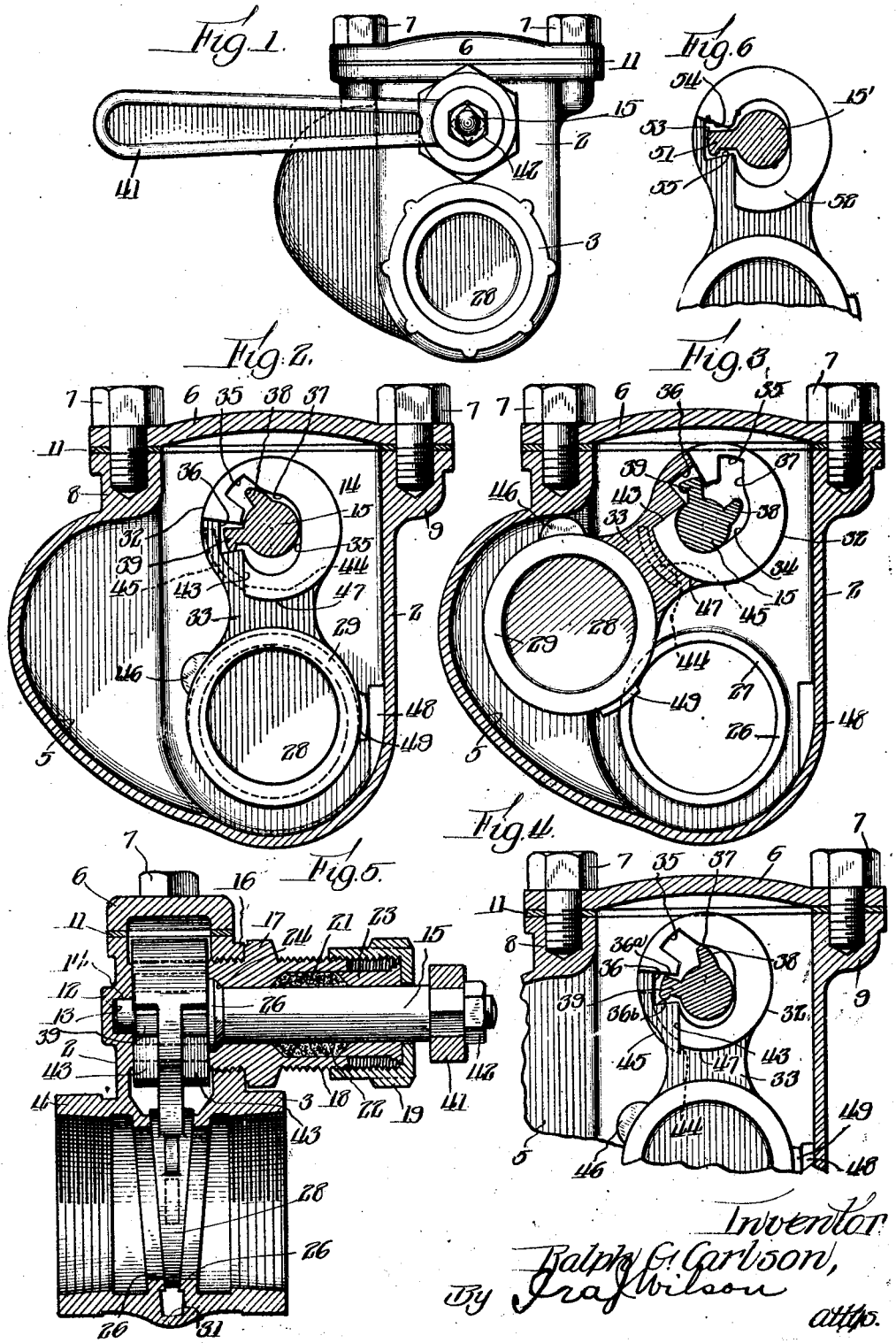

1,688,686

UNITED STATES PATENT OFFICE.

RALPH G. CARLSON, OF CHICAGO, ILLINOIS, ASSIGNOR TO CRANE CO., OF CHICAGO, ILLINOIS, A CORPORATION OF ILLINOIS.

QUICK-OPENING GATE VALVE.

Application filed January 10, 1927. Serial No. 160,127.

This invention pertains to fluid control valves and more particularly to those valve mechanisms of the gate type which are adapted to be moved transversely of the valve seat or port to open or close them.

Valves of the gate type have many advantages over valves of other types for certain usages and under certain circumstances and while they are in fact preferred in such instances, they are nevertheless open to several objections, most of which fortunately are of more or less insignificant nature and therefore will not be dwelt upon herein.

One of the difficulties encountered with valves of the character specified above arises when the fluid line in which the valve is placed is under relatively high pressure or when sedimentary or other deposits have accumulated around the valve gate and its seat. This often renders it difficult to break the valve away from its seat to open it and likewise it often becomes difficult to close the valve tightly against its seat. Sometimes a careless or thoughtless operator, finding the valve resisting casual opening pressure, will forcibly strike the valve with some heavy implement in an effort to break the seal between the gate and the seat and thereby injure the valve or its mechanisms more or less seriously. Sometimes also the operator is in a hurry and becomes careless and does not entirely close the valve, presuming that the valve is closed when he has met with some slight resistance in operating the handle or other control to close it with the result that the valve leaks. The blame is then placed upon the valve or upon the manufacturer of the valve.

One of the primary objects of the invention is to provide a valve of the character described so constructed that a maximum of power may be initially or finally applied to the gate to break it away from or close it against its seat respectively.

Another object is to provide means for increasing the speed of movement of the valve away from or toward its seat after the initial opening or before the final closing movements respectively are effected.

Still another object is to provide a valve of the character described overcoming or obviating the difficulties and defects heretofore encountered and one which may be quickly closed with a minimum of exertion on the part of the operator and one which may be simply constructed, readily installed, easily operated and quickly and cheaply repaired.

A further object is to provide a valve stuffing box construction whereby fluid pressure on the valve will tend to increase rather than decrease the seal between the valve and its exterior regardless of the direction from which the fluid pressure is exerted on the valve.

Many further objects including the details of construction and the arrangement of the parts, as well as the advantages, functions and uses of the invention, will or should become readily appreciated after reading the following description and claims and after viewing the drawing in which:

Fig. 1 is a front elevational view of one form of valve constructed in accordance with my invention.

Figs. 2 and 3 are sectional views taken in a plane parallel to the plane of the view of Fig. 1, Fig. 2 showing the valve in closed position and Fig. 3 showing the valve in full opened position.

Fig. 4 is a view similar to the views of Figs. 2 and 3 except with parts broken away, showing the valve mechanism just at the point where the cam on the stem has broken the disc away from its seat and the disk is about to be swung to the position in Fig. 3 after it has been raised from the position shown in Fig. 2.

Fig. 5 is a transverse sectional view taken on the line of centers of the axes of the stem and valve gate, and Fig. 6 is a side elevational view of a valve gate embodying a modified form of construction.

The valve casing, generally designated 2, is provided with oppositely directed pipe attaching bosses 3 and 4 which are suitably tapped for connection in a fluid line, with an internal recess 5, for a purpose which will hereinafter appear, and with a cap or plate 6 through which stud bolts 7 pass into thickened portions 8 and 9 integral with the body for securing the cap and body together. A gasket 11 is interposed between the cap and body to provide a fluid tight connection. The body is also provided with a boss 12 which is drilled and finished internally to provide a bearing 13 in which the reduced end 14 of a valve stem 15 is rotatably supported.

The opposite side of the body is provided with an internally threaded boss 16 in which a bearing sleeve 17 for the valve stem 15 is threadedly engaged. Externally the sleeve 17 at its outer end is threaded, as shown at 18, for the reception of a similarly internally threaded packing gland nut 19 and internally at this end the sleeve 17 is recessed circumferentially and for a substantial portion of its length in order to provide a packing chamber 21 within which packing 22 is placed and held under compression by a packing gland sleeve 23 adapted to be urged thereagainst by the nut 19. Internally at its inner end the sleeve 17 is provided with a tapered shoulder 24 against which a similarly tapered flange 25 formed integral with the valve stem 15 is adapted to abut in order to increase the seal between the internal portion of the valve or valve chamber and the exterior thereof. It will be apparent that any pressure against the valve stem from the left, viewing Fig. 5, will tend to urge the flange 25 tightly against the tapered shoulder 24 and thereby seal the joint tightly.

Each port opening, designated 26, is provided with a seat 27 against which a substantially wedge-shaped disk or gate 28 having seat engaging faces 29 is adapted to seat. The seats 27 lie in planes intersecting one another in space below the valve body and the seat faces 29 are formed on the disk in a similar manner so that when the disk 28 is brought down to engage the seats 27, a tight wedging action will ensue. A recess 31 of slight depth is provided in the valve chamber below the port openings in order to give clearance for the disk 28, should the same wear slightly. The disk itself is mounted on the stem 15 and in the body 2 for movement with the stem and with respect thereto, as will now be more clearly set forth.

An operating head, generally designated 32, is integrally joined to the disk by means of a web 33 and is provided with an elliptical opening 34 adapted to be received over the inner end of the stem 15, the major axis of the ellipse lying substantially along the longitudinal axis of the disk web and head. Opening into the stem receiving opening 34 and preferably extending through the head 32 from side to side thereof are a pair of slots 35 and 36, the first of which I shall term a cam slot and the second of which I shall term a lever slot. The cam slot is provided with a cam shoulder 37 and is adapted to receive a cam lug 38 formed longitudinally on the inner end of the stem 15, while the lever slot 36 has opposed shoulders 36$^a$ and 36$^b$ with which the lever projection 39, also formed longitudinally on the inner end of the stem 15, is adapted to alternately engage, sufficient clearance being left between the sides of the slots 35 and 36 and the cam and lever projections 38 and 39 for each to operate independently of the other except as will later appear.

Viewing Fig. 2 et seq and assuming it be desired to open the valve and the stem 15 be provided with a suitable handle or operating lever 41 held thereon by means of a nut 42, the lever 41 is moved in a clockwise direction which engages the cam projection 38 with the cam shoulder 37, and tends to lift the valve disk 28 and also tends somewhat to swing the disk in a clockwise direction but as the valve cannot swing or rotate by reason of the interengagement of a pair of shoulders 43 provided on an integral portion of the head 32 with shoulders 44 provided on arcuate abutments 45 integral with and symmetrically disposed on the opposite sides of the body, and the stem being immovable from its pivotal center, the valve is bound to rise vertically from its seats. This movement is permitted by reason of the clearance afforded by the elliptical opening 34 and is at relatively slow speed, although the effective leverage is relatively high because of the camming action. Continued clockwise movement of the lever 41 will raise the valve to the position indicated in Fig. 4 where the shoulder 43 is shown as just about to clear the shoulder 44.

When the valve has been raised to about the position shown in Fig. 4, the lever projection 39 is adapted to come into operation and engage the side wall 36$^a$ of the slot 36. The disk is thereby lifted further until the shoulder 43 clears the shoulder 44, whereupon continued clockwise rotation of the stem 15 will swing the valve disk to the position indicated in Fig. 3 where its further movement is limited by an abutment 46 formed integral with the disk engaging with the interior wall of the valve body. This swinging movement of the valve is at relatively high speed, although the effective leverage and therefore the power is accordingly reduced.

On return movement the operations are substantially reversed, the lever 41 being swung in a counter-clockwise direction, viewing Fig. 1, causes the lever projection 39 to engage the shoulder 36$^b$ and thereby swing the valve back toward its position shown in Fig 4, a shoulder 47 riding on the arcuate ribs 45 until the shoulder 43 clears the shoulder 44. At about this time, a rib or stop 48 formed integral with the body is engaged by a cooperative stop 49 on the side of the disk and the valve is prevented from further clockwise movement, although it may move vertically upward or downward. Continuing anti-clockwise movement of the lever 41 the lever 39 engaged with shoulder 36$^b$ forces the valve to its seats and tightly thereagainst. It will be noted that as soon as the valve has reached the position where the shoulders 43 clear the shoulders 44, the leverage tending to force the valve toward its seats again becomes relatively high.

The modified construction, shown in Fig. 6, primarily differs from the construction previously described, in that the cam and lever are combined in a single member 51 formed integral with the stem 15′ in a manner similar to the manner in which the cam 38 and lever 39 are formed on the stem 15. The head 52 of the valve, in this instance, is provided with a single slot 53 having what I shall term a cam shoulder 54 and what I shall term a lever shoulder 55 sufficiently spaced apart to provide clearance on either side of the combined cam and lever 51 when the same is in mid-position. As the stem 15′ is rotated in a clockwise direction, viewing Fig. 6, the member 51 engages the cam surface or shoulder 54 and performs both the function of the cam 38 and the function of the lever 39 of the previously described arrangement. On return the opposite side of the member 51 engages the lever surface or shoulder 55 and returns the valve to its seats. Since this form of valve and stem is otherwise substantially identical with the form illustrated in Figs. 2 to 5 inclusive, it is but a simple matter to substitute it in the place of the valve and stem 28 and 15 respectively.

Bearing the foregoing in mind it should be appreciated that I have provided a unique type of valve mechanism having all of the advantages and overcoming all of the defects of prior structures hereinabove set forth, as well as one having many other novel features of construction and arrangement and operation susceptible of many uses and while I have illustrated and described what at present forms a preferred embodiment of my invention, I do not desire to be limited thereto but only by the spirit of the invention and the scope of the appended claims.

I claim:

1. The combination with a valve, a seat therefor and an operating handle, said valve having a single pivot connection between it and said handle and being movable between extreme open and closed positions, of means rigidly connected to said pivot for moving said valve initially in a direction parallel a radius of said pivot and for thereafter moving said valve about said pivot, said movements together serving to move said valve from one extreme position to the other.

2. In a gate valve, a valve body having inlet and outlet ports, a valve operating lever, a closure member for one of said ports and pivotally connected with said lever, and means for moving said member from said port at relatively low speed and with relatively high power during an initial opening movement and at relatively high speed and low power during a subsequent part of the opening movement, said movements being in directions transverse one another, said means including means rigidly secured to said lever for varying the effective leverage on said gate.

3. In a gate valve, a valve body having inlet and outlet ports, a stem rotatably mounted in said body, a closure member for one of said ports, said member having a single opening therethrough and said stem passing through said opening, and means for initially moving said member from port closed position under relatively high power and for thereafter moving said member from port closed position under relatively low power, said movements being in directions transverse one another, said means including means in said opening for varying the effective leverage on said gate.

4. In a valve, a body having a port and a valve seat for said port, a valve adapted to engage said seat for closing said port, an operating head on said valve, said head having an opening therethrough, a stem having a portion disposed through said opening and rotatably mounted in said body, and means including a cam on said stem operative to engage said head upon initial movement of said valve away from its seat for moving said valve in a right line at low speed and under high power and upon continued movement for moving said valve in a curved path at high speed and under low power.

5. In a valve, a body having a port and a valve seat for said port, a valve adapted to engage said seat for closing said port, an operating head on said valve, said head having an opening therethrough, a stem having a portion disposed through said opening and rotatably mounted in said body, cam means on said stem operative upon inital movement of said valve away from its seat to engage said head within said opening for moving said valve in a right line at relatively low speed and under high power for a predetermined distance, and means operative after said valve has traveled said predetermined distance for moving said valve further from its seat in a curved path at relatively high speed and under relatively low power.

6. In a valve, a body having a port and a valve seat for said port, a valve adapted to engage said seat for closing said port, an operating head on said valve, said head having an opening therethrough, a stem having a portion disposed through said opening and rotatably mounted in said body, and means including a cam on the portion of said stem disposed through said opening operative upon initial movement of said valve away from its seat for moving said valve in a right line at low speed and under high power and upon continued movement for moving said valve in a curved path at high speed and under low power, said means being operative for moving said valve toward its seat under high power for a final part of the closing movement.

7. In a valve, a body having a port with a surrounding seat, a valve stem rotatably mounted in said body on an axis substantially parallel the axis of said port, a valve disc mounted in said body for movement toward and from port closed position, an operating head secured to said disc and having a portion embracing a portion of said stem, and means including a cam and lever between said head and stem portions and connecting the same for moving said valve disc in a line substantially parallel the line connecting the port and stem axes for a predetermined distance and in a path transverse said line of movement for another predetermined distance upon rotation of said stem for opening and closing said port.

8. In a valve, a body having a port and a valve seat for said port, a valve disc adapted to engage said seat to close said port, a stem rotatably mounted in said body, a head secured to said disc and having an opening therethrough having irregular walls, said stem having a portion projecting into said opening, and means including a lateral projection on said stem portion adapted to engage portions of the said irregular walls for moving said disc in a straight line substantially parallel a line connecting the port and stem axes for a predetermined distance and in a path transverse said line of movement for another predetermined distance upon rotation of said stem in one direction.

9. In a valve, a body having a port and a valve seat for said port, a valve disc adapted to engage said seat to close said port, a stem rotatably mounted in said body, a head secured to said disc and having an opening therethrough having irregular walls, said stem having a portion projecting into said opening, and means including a pair of lateral projections on said stem portion adapted to engage portions of the said irregular walls for moving said disc in a straight line substantially parallel a line connecting the port and stem axes for a predetermined distance and in a path transverse said line of movement for another predetermined distance upon rotation of said stem in one direction.

In witness of the foregoing I affix my signature.

RALPH G. CARLSON.